J. A. FREY.
Soldering Furnaces.
No. 138,626. Patented May 6, 1873.
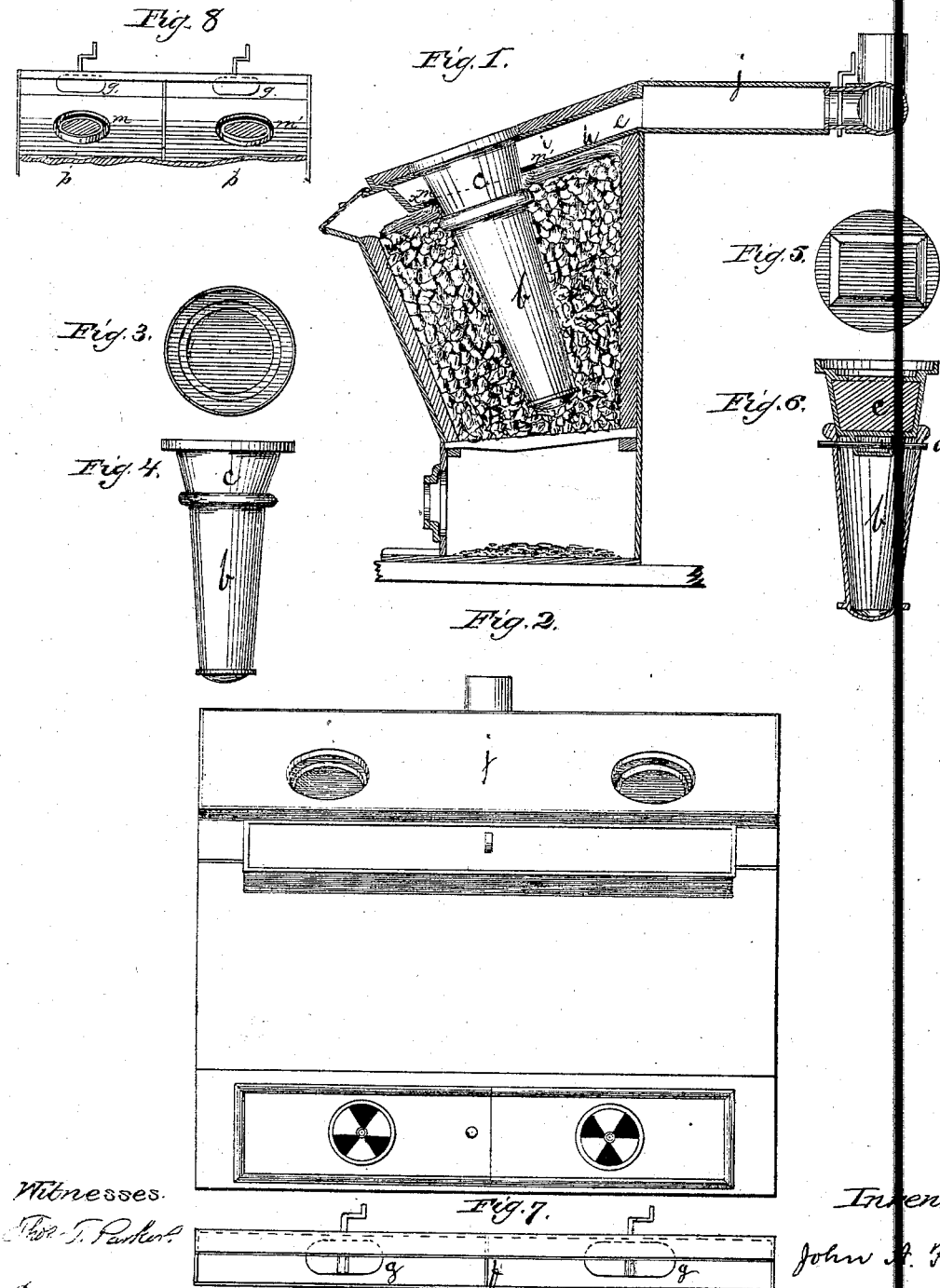

UNITED STATES PATENT OFFICE.

JOHN A. FREY, OF JERSEY CITY, NEW JERSEY.

IMPROVEMENT IN SOLDERING-FURNACES.

Specification forming part of Letters Patent No. 138,626, dated May 6, 1873; application filed March 21, 1873.

*To all whom it may concern:*

Be it known that I, JOHN A. FREY, of Jersey City, in the State of New Jersey, have invented an Improvement in Means for Soldering Fruit and other Cans, of which the following is a specification:

In soldering with the soldering-iron, the surfaces are generally cold, and on this account the soldered joint may be imperfect. My invention is in the line of those improvements that look to the dispensing with the use of the soldering-iron, and to the avoidance of imperfect soldering. To this end the solder is used in chips laid upon the surfaces to be soldered, and the solder melted by the heat of these surfaces, the whole can being exposed to heat.

The annexed drawing shows a portable furnace, Figure 1 being a view by vertical section, and Fig. 2 a perspective view; Figs. 3, 4, 5, and 6 being views of parts detached. Fig. 7 is a view by horizontal section on the line *x* of Fig. 1.

This furnace may be made of sheet or cast iron. A warming-table is attached thereto. The top plate of the fire-box is covered with a non-conducting substance. Copper cups, with inverted cast-iron cones for heating the cups, are inserted in the holes of the plates, which heat sufficiently to fuse the solder, and thereby securely solder the heads and ends fast to the body of the can.

The several parts of the furnace are thus indicated: Letter *a* marks the fire-box with the fuel; *b*, the inverted cones, attached to the copper cup *c*, the cone being held to the cup by the pin *d*, and can be readily detached; *e*, space between the top plate and fire-plate; *f*, partition dividing the space; *g*, the dampers. Each cup has a separate flue and damper, to enable the operator to have full control and keep a uniform heat for each cup, the face of which can be turned out so as to leave shoulders for three or four sizes of cans; *h*, the fire-plate, between which and the top plate *i* is a space, *e*, of one inch. The plate is pierced with the holes necessary to accommodate any number of cones that may be required, the holes being three-quarters of an inch larger all around than the cones for the passage of the heat and flame on the way to the flues, thereby economizing fuel, and concentrating the heat on the cups where most required.

The copper cups can be made of cast or molded copper, with sockets underneath for attaching them to the cast-iron cones. In the top or face of each cup there is a depression or seat filled with plaster of Paris, it being a suitable non-conductor, so as to avoid discoloring the heads of cans from excessive heat. The contact of the tin with the copper generates a galvanic action which greatly contributes to the flow of the solder, and increases the affinity that the tin has for the solder.

The top plate *i* has a corresponding number of holes of less diameter than the inner plate *h*, upon the top edge of which the flange of the cup rests, affording support, and allowing of the cup being taken out or revolved, when required. This top plate has a flange surrounding each cup, and the same upon the outer edge, about one inch deep, or more, which space is filled in with plaster of Paris, or other non-conducting substance, to avoid scorching the operator's face and hands when at work.

The top of the furnace inclines at an angle of about twenty degrees, to give the cans a cant in soldering. The fire-box has a feed-door, draft-register, and grate, and can be lined with fire-brick or soap-stone of proper thickness.

The warming-table *j* I make of sufficient width to accommodate three or four rows of cans. On this the resin fuses, so that it enables the operator to handle and solder rapidly when he places the cans upon the cups.

Two ordinarily skilled active boys can readily solder the ends on three or four thousand cans per day, with the use of a half bushel of nut or chesnut hard coal. By the old method five hundred is a good day's work for a skilled man. This is a great saving of time and fuel.

I claim—

1. The copper cup *c* as a heating-surface for the can, in combination with the cone or iron surface for transmitting the heat from the fuel to the cup and can.

2. The annular spaces $m$ $m'$, between the fire-plate $h$ and the top plate $i$, provided with independent dampers for controlling and directing the heat to the cups, substantially as described.

This specification signed this 19th day of February, 1873.

JOHN A. FREY.

Witnesses:
JOHN A. MCGRATH,
JOHN P. LAUDRINE.